United States Patent [19]

Kowalski

[11] Patent Number: 4,769,052
[45] Date of Patent: Sep. 6, 1988

[54] COMPACT FILTER ASSEMBLY

[75] Inventor: V. Walter Kowalski, E. Lyme, Conn.

[73] Assignee: Cuno Incorporated, Meriden, Conn.

[21] Appl. No.: 899,468

[22] Filed: Aug. 21, 1986

[51] Int. Cl.[4] ............................................. B01D 46/00
[52] U.S. Cl. ...................................... 55/379; 55/380
[58] Field of Search ................. 55/380, 379, 378, 498, 55/497, 504, 508, 515; 210/473–477, 484, 485, 451, 452, 455, 497.01

[56] References Cited

U.S. PATENT DOCUMENTS

| | | | |
|---|---|---|---|
| 948,082 | 2/1910 | Wickwire | 55/378 |
| 2,044,827 | 6/1936 | Adams | 55/373 |
| 2,091,137 | 8/1937 | Carson | 55/378 |
| 2,100,374 | 11/1937 | Biever | 55/380 |
| 2,331,332 | 10/1943 | Latta | 55/381 |
| 2,591,382 | 4/1952 | Smith | 55/378 |
| 3,347,390 | 10/1967 | Tietz et al. | 210/448 |
| 3,370,711 | 2/1968 | Hitzelberger et al. | 210/448 |
| 3,771,664 | 11/1973 | Schrink et al. | 210/448 |
| 3,826,066 | 7/1974 | Higgins | 55/380 |
| 4,193,780 | 3/1980 | Cotton, Jr. et al. | 55/378 |
| 4,220,459 | 9/1980 | Hammond et al. | 55/341 R |
| 4,342,574 | 8/1982 | Fetzer | 55/341 M |
| 4,386,948 | 6/1983 | Chokski et al. | 55/499 |
| 4,467,494 | 8/1984 | Jones | 55/379 |
| 4,574,047 | 3/1986 | Rosaen | 210/484 |

FOREIGN PATENT DOCUMENTS 113593 7/1941 Australia ............................. 55/380

Primary Examiner—Bernard Nozick
Attorney, Agent, or Firm—Michael E. Zall

[57] ABSTRACT

A flexible fabric filter apparatus having multiple support surfaces for shaping a flexible fabric filtering element into a compact shape and in which apparatus the support surfaces assist in sealing the filtering element to the filter housing between the inlet and outlet of the filter housing. A method for assembling a filter apparatus having a flexible fabric filtering element which method includes the steps of manipulating the filtering element to form inner and outer filtering sections, mounting the inner and outer filtering sections on corresponding inner and outer support surfaces, and sealing a filter section with the filter housing at a point between the inlet and outlet of the filter housing.

8 Claims, 6 Drawing Sheets

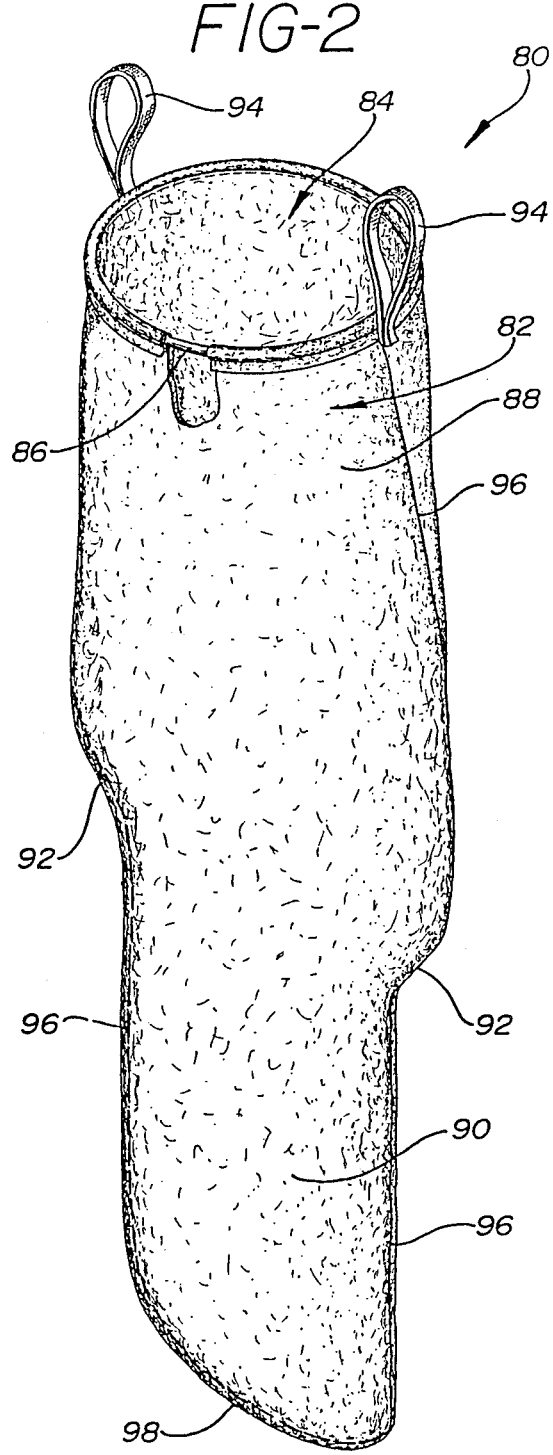
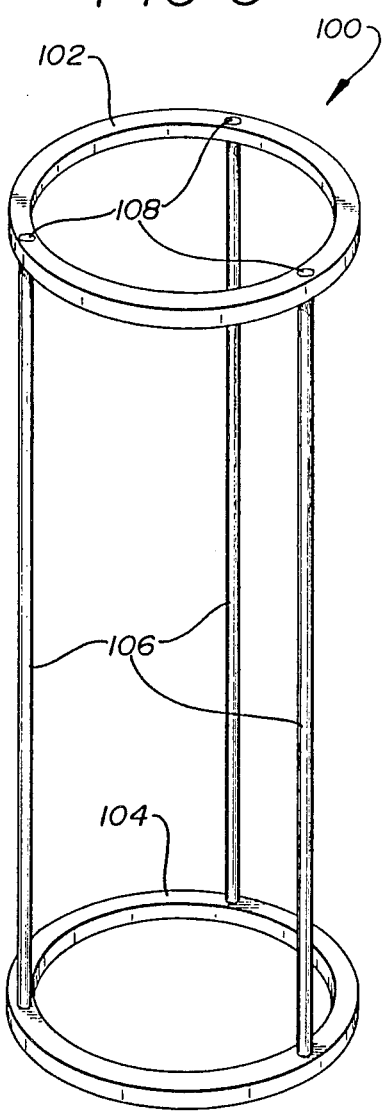

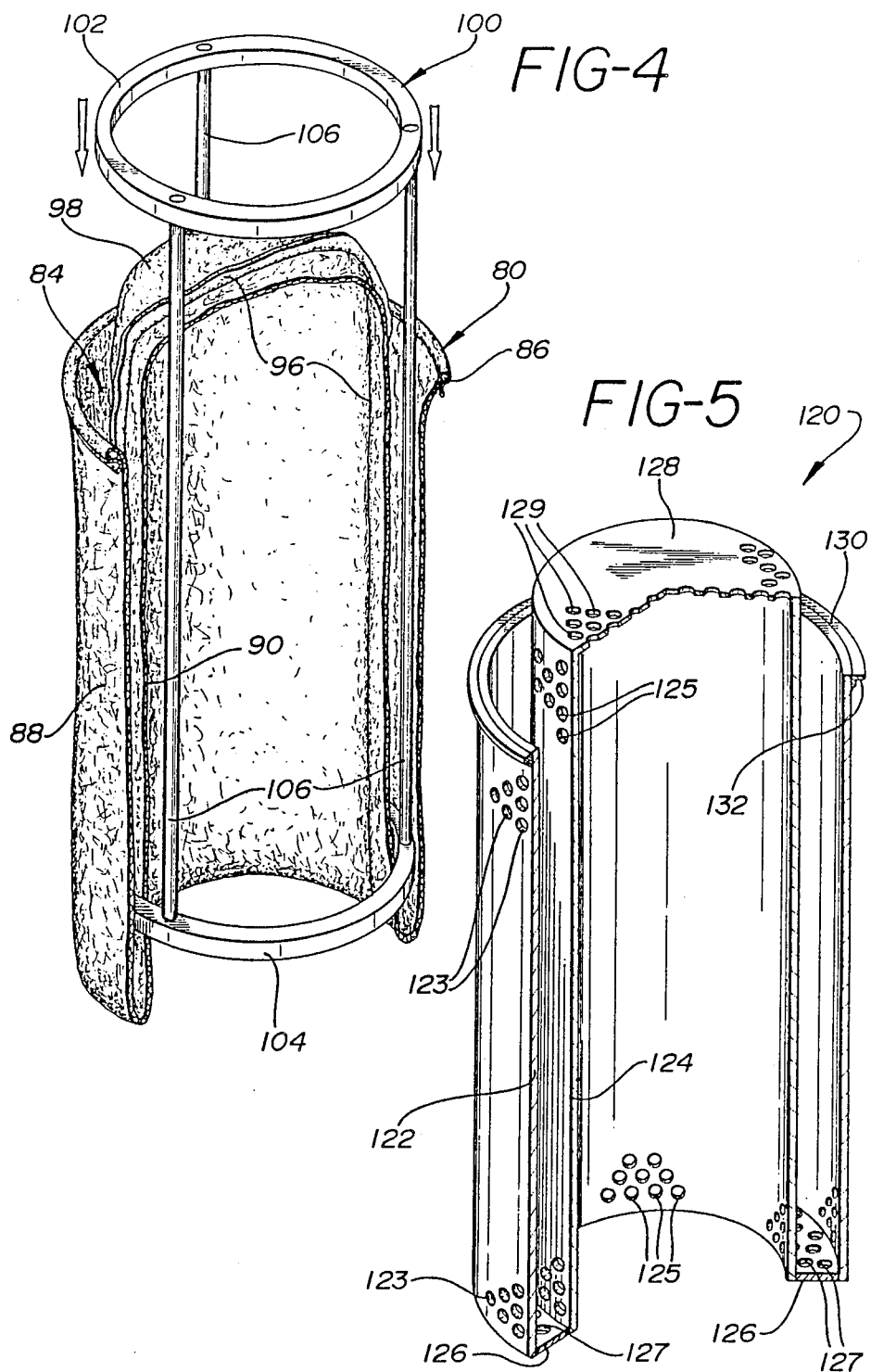

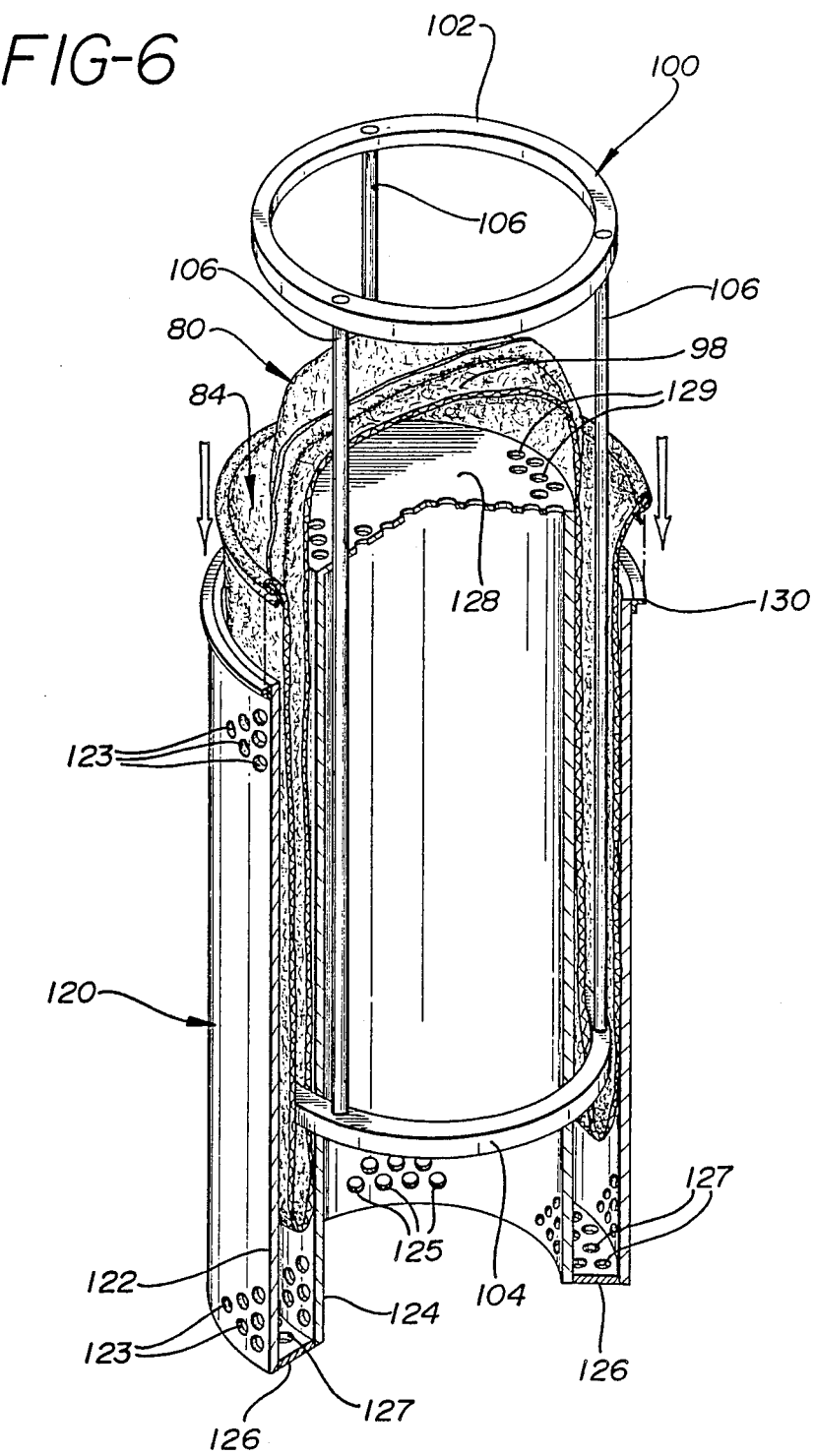

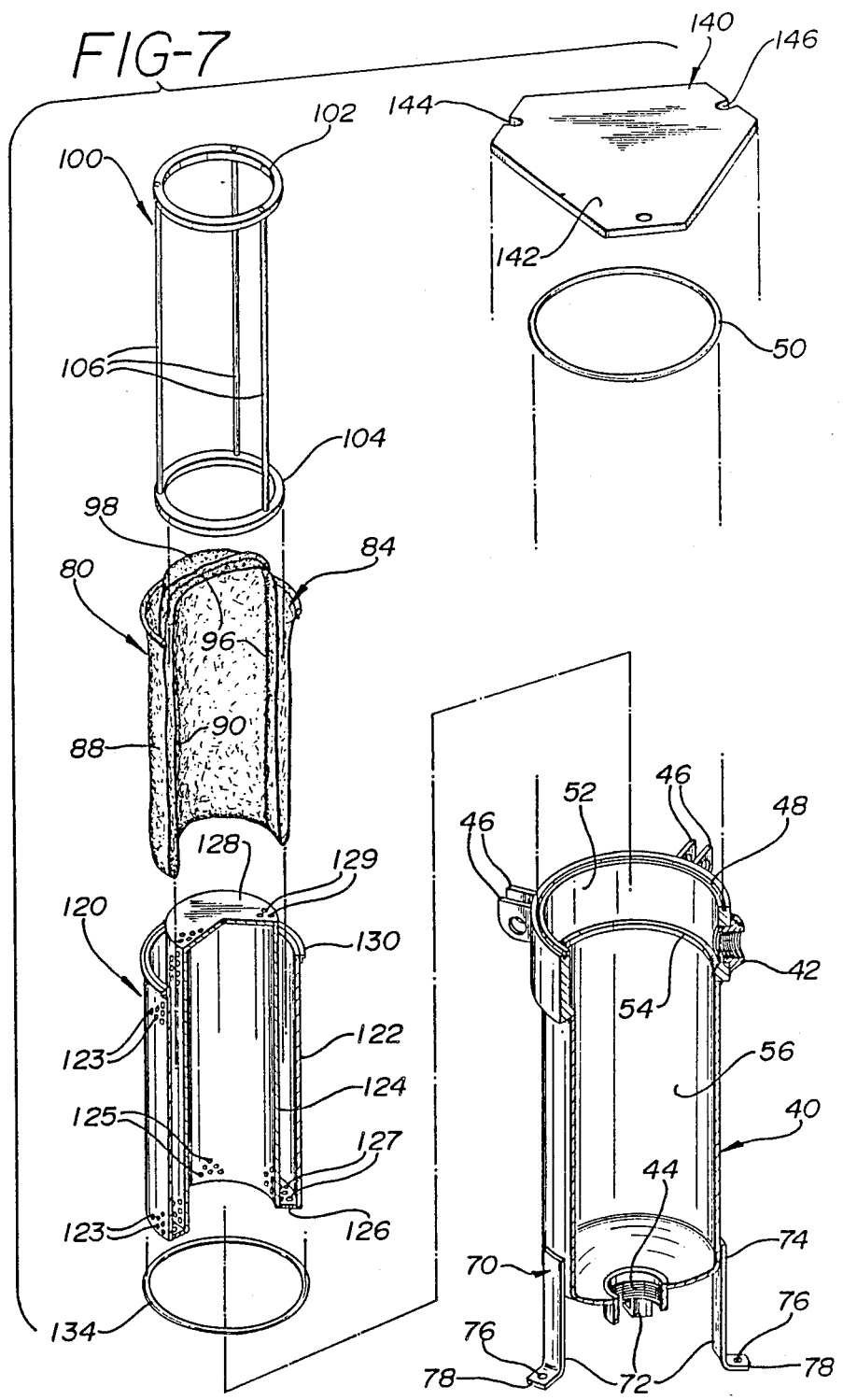

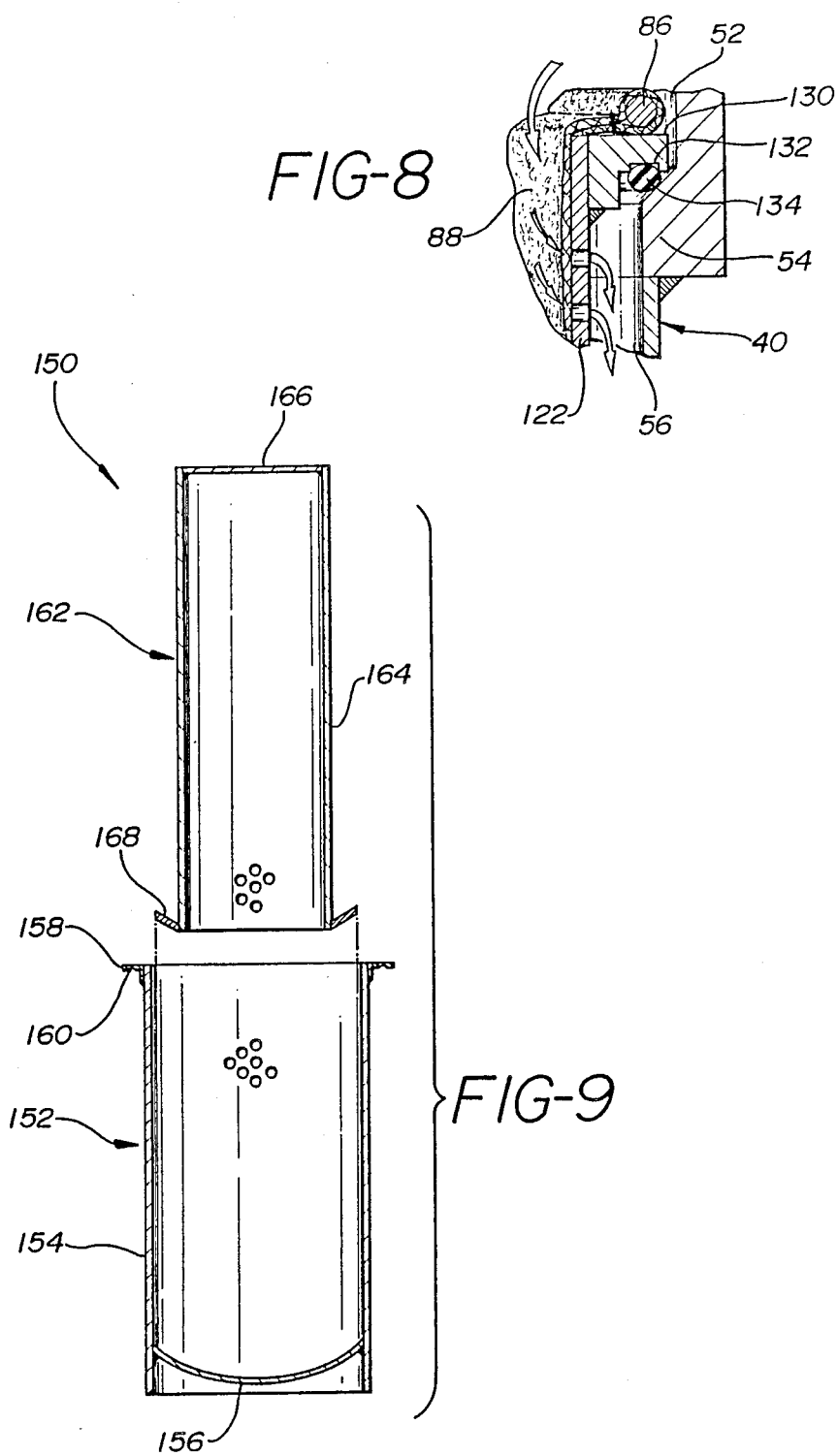

COMPACT FILTER ASSEMBLY

BACKGROUND OF THE INVENTION

1. Field of the Invention

This invention relates to filters having thin, flexible filtering elements, and more particularly to bag-type filters having support surfaces for maintaining the shape of the filter bag during operating conditions.

2. Description of the Prior Art

Filter assemblies using bag like filtering elements have long been useful and widely accepted. Much effort has been expended in attempting to increase the efficiency and effectiveness of these devices. Much effort has been directed towards improving the area of filtering surface that can be provided by bag filters in relation to the size of the filter housing. Additionally, efforts have been directed to adequately seal the filter housing inlet from the filtering housing outlet to prevent any escape of the material being processed, and to separate the unfiltered from the filtered material. Examples of such efforts are shown in numerous patents. For example, U.S. Pat. No. 2,591,382, issued to A. E. Smith, shows a vacuum cleaner having two separate filtering bags in an attempt to maximize the filtering efficiency. The outer bag is a cloth bag whereas the inner bag that filters the majority of the air-stream is a paper bag which would be disposable.

U.S. Pat. No. 3,771,664, issued to Schrink et al., shows a bag-type filter in a housing in which the bag has a seal at the open end which seal is compressed between the housing and the cover to seal the unit. This patent and U.S. Pat. No. 948,082, issued to Wickwire, both show basically bag-type filters having a support screen in which the bag forms a straight cylindrical surface of a single pass to act as the filter.

U.S. Pat. No. 2,331,332, issued to L. H. Latta, deals with the problem of inserting and removing the filter bag from the housing without damaging the bag when it contacts the support surface. This is accomplished by providing relatively smooth contacting surfaces between the support surface and the bag.

Other more complex bag-type filters have been provided. For example, Macro-Flow Filter Systems of 7 Hyde Street, Stamford, Conn., offered a fairly complex bag-type filter having a tubular filter element, open at both ends, folded upon itself. The filter assembly, however, required relatively elaborate multiple sealing arrangements to seal both open ends of the cylindrical bag-type filter.

U.S. Pat. No. 4,220,459, issued to Hammond et al., shows a bag-type filter having stiffening frames which are inserted within the bag to maintain the shape of the bag and to allow the bags to be inserted into the mounting plates.

U.S. Pat. No. 4,342,574, issued to Fetzer, deals with high temperature filters having filter cells lined with replaceable filter hose of heat resistant fabric or tissue.

U.S. Pat. No. 4,193,780, issued to Cotton, Jr., et al., deals with V-cell air filters which are supported by means of a heavy gauge wire mesh in a "V" or a series of adjacent "V" shapes to form a supporting frame for the filter bags.

Other patents dealing with general areas of filtration are U.S. Pat. No. 3,347,390, issued to Tietz et al., and U.S. Pat. No. 3,370,711, issued to Hitzelberger et al.

SUMMARY OF THE INVENTION

The present invention sets forth a flexible fabric filter apparatus having multiple support surfaces for shaping a flexible fabric filtering element into a compact shape and in which apparatus the support surfaces assist in sealing the filtering element to the filter housing between the inlet and outlet of the filter housing.

Also provided is a method for assembling a filter apparatus having a flexible fabric filtering element which method includes the steps of manipulating the filtering element to form inner and outer filtering sections, mounting the inner and outer filtering sections on corresponding inner and outer support surfaces, and sealing the outer filtering section with the filter housing at a point between the inlet and outlet of the filter housing.

Accordingly, it is an object of the present invention to provide a filter apparatus having a flexible filtering element which apparatus is relatively compact, and which provides a relatively large amount of filtering surface area in relation to the size of the filter housing.

It is another object of the present invention to provide a filter apparatus having a flexible filtering element in which the flexible filtering element is relatively easy to install and remove and for which apparatus most of the more exacting filtering element installation operations can be conducted outside of the filter housing.

It is yet another object of the present invention to provide a filter apparatus having a flexible filtering element which separates the filter housing into a relatively small dirty side volume thereby reducing the weight of liquid that must be removed when the bag plugs.

It is still another object of the present invention to provide a filter apparatus having a flexible filtering element which enables the flexible filtering element to be removed without fear of contaminating the clean side of the filter housing.

It is a further object of the present invention to provide a filter apparatus having a flexible filtering element in which the pressure of the inlet fluid produces or enhances the seal between the flexible filtering element and the filter housing.

It is another object of the present invention to provide a filter apparatus having a flexible filtering element which includes support surfaces that form the filter bag into a complex reversed shape which allows for compact filter operations.

It is yet another object of the present invention to provide a filter apparatus having a flexible filtering element which apparatus provides sealing between the inlet and the outlet by means of the filter bag compressing against a metal surface to provide an effective seal.

It is still another object of the present invention to provide a filter apparatus having a flexible filtering element which includes an apparatus which stretches the filtering element for proper seating, sealing and positioning to obtain maximum filter efficiency.

It is another object of the present invention to provide a filter apparatus having a flexible filtering element which is relatively light in weight for the filtering area provided, without sacrificing strength or durability.

It is yet another object of the present invention to provide a filter apparatus having a completely shaped flexible filtering element which is relatively simple in construction.

It is still another object of the present invention to provide a flexible fabric filter apparatus that is relatively simple in construction; that is durable; that can be manufactured relatively economically; that can be serviced substantially outside of the filter housing.

Additionally, it is an object of the present invention to provide a method of assembling a filter apparatus having a flexible fabric filtering element in which the filtering element is formed and shaped outside of the O-ring housing and which can be easily inserted in the filter housing after it has been formed and shaped.

It is another object of the present invention to provide a method of assembling a filter apparatus having a flexible fabric filtering element in which the filtering element is automatically stretched and properly seated prior to placing in the filter housing.

It is another object of the present invention to provide a method of assembling a filter apparatus having a flexible fabric filtering element in which the filtering element enables easy installation and removal of the filtering element without contaminating the filter housing.

It is another object of the present invention to provide a method of assembling a filter apparatus having a flexible fabric filtering element in which the filtering element is relatively simple to perform.

It is another object of the present invention to provide a method of assembling a filter apparatus having a flexible fabric filtering element in which the filtering element can be performed with relative speed and simplicity with a minimum number of operations.

Other objects and advantages will be apparent from the description of the invention and the novel features will be particularly pointed out hereinafter in the claims.

BRIEF DESCRIPTION OF THE DRAWINGS

FIG. 2 is a drawing of a filter bag suitable for use in the filter of the present invention.

FIG. 3 is a perspective of the stretching element used in the invention.

FIG. 4 shows the seating and holding element as installed in the filter bag of FIG. 1 after the bag has been reversed upon itself to form inner and outer filtering surfaces.

FIG. 5 shows the inner and outer support surfaces for the filter bag.

FIG. 6 shows the elements of FIGS. 2, 3 and 4, in operative relation.

FIG. 7 is an exploded view showing the elements of the filter assembly of the present invention as shown in FIG. 1.

FIG. 8 is an enlarged view showing the open end of the filter bag with the outer support surface and the filter housing.

FIG. 9 is a sectional view showing another embodiment of the support surfaces for the filter bag.

DETAILED DESCRIPTION OF THE INVENTION

Figure 1:
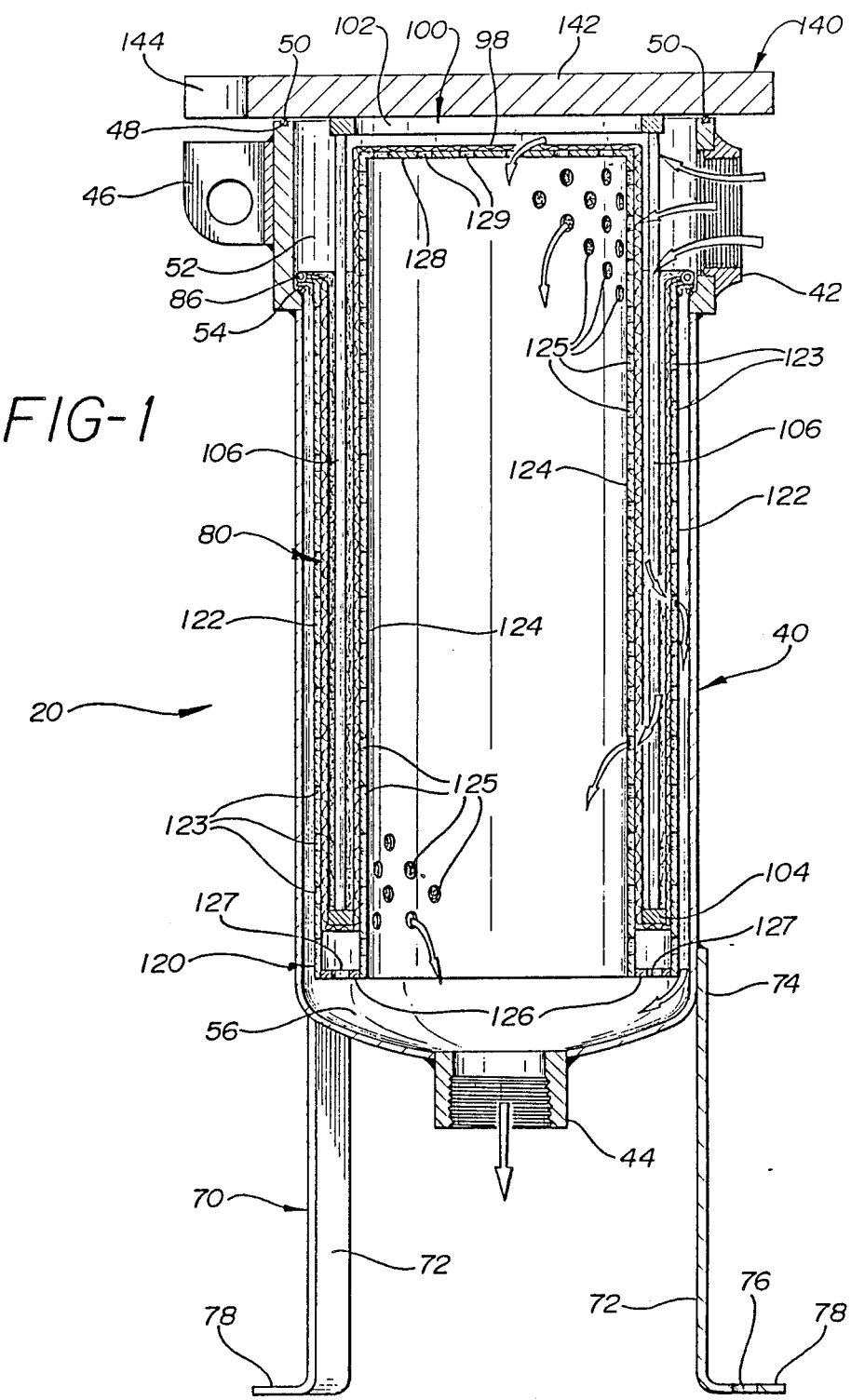
FIG. 1 is an elevation partially in section showing the filter assembly built in accordance with the teachings of the present invention.

Referring to FIGS. 1-8, a filter assembly is shown generally indicated at 20. The filter assembly has a housing 40 supported by a stand generally indicated at 70 and closed by a cover generally indicated at 140. The cover is secured to the upper part of the filter housing by means of swivel clamps (not shown) which are mounted in the mounting bosses 46 on the housing 40, and fit into the slots 144 and 146 in the cover to allow the cover to be clamped down in a manner well-known in the art. The top of filter housing 40 has an O-ring groove 48 in which is positioned an O-ring 50 that seals the cover to the top of the housing. The housing has an inlet 42 at the top of the housing an outlet 44 at the bottom of the housing. The top of the housing has a wider section 52 and the lower portion of the housing has a narrower section 56. A shoulder 54 connects the narrower section 56 of the housing to the wider section of the housing 52 and also functions in the sealing of the filter as will be described below.

The housing as shown in FIG. 1 is supported by a stand generally indicated at 70 having legs 72 which are welded to the bottom or lower portion of the housing at points 74. Each of the legs has a turned out portion 78 in which is formed a bolting hole for anchoring the filter assembly.

As shown in FIG. 2, the filtering element of the invention consists of a filter bag generally indicated at 80 which is made of a wide number of filtering materials depending upon the specific filtering function to be performed. The filter bag has a circular top 84 which is formed by a shaping means in the form of a metal ring 86. The ring 86 is held in position by reversing the upper portion of the bag around the ring and sewing the reversed portion to the body of the bag. The bag has a wider upper portion generally indicated at 88 and a narrower lower portion 90. A transitional area 92 connects the upper with the lower portion. The bag has handles 94 to assist in removal of the bag from the filter apparatus.

The bag can be made from a single sheet of material in which the pattern is cut and then a seam 96 run from the transition point to the narrow portion, then around the bottom. It should be noted that other shaped bags could also be used.

Referring to FIGS. 2 and 4, the filtering element or bag is reversed upon itself to provide an inner surface 90 and an outer surface 88 to in effect double the filtering area in relation to the length of the filter housing. The reversal of the filtering element or bag is most easily accomplished by means of the seating and the holding or stretching element generally indicated at 100 which has an upper ring 102 and a lower ring 104 connected by extending rods 106. Each of the extending rods are fastened at 108 at their ends to the upper and lower rings of the stretching element. The bag is inserted into the center of one of the rings and then the open end of the bag is brought down around the outside of the ring to form the desired configuration of the bag. The stretching element 100 will then be positioned between the inner and outer filtering surfaces 88 and 90 respectively as shown in FIG. 4.

In order to maintain the filtering element or bag in its desired configuration, a support element generally indicated as 120 is provided. As seen in FIG. 5, the support element has an outer support wall 122 and inner support wall 124 connected by means of a bottom surface 126. The inner support wall and the outer support walls are in the form of cylinders. The inner support cylinder is closed at the upper portion of the support element by a top surface 128. The upper portion of the outer support wall 122 has a mounting flange 130 which is adapted to coact with the shoulder 54 of the housing to position the support element in the filter housing (see FIG. 8).

As seen in FIG. 6, the stretching element 100 with the filter bag 80 positioned around it is placed in between the inner and outer support walls 122 and 124. The stretching element 100 is extended downward into the space between the inner and outer support walls until the open end of the bag supported by the metal ring 86 is seated against the top of the mounting ring 130, and additionally the bottom of the bag 98 is fitted against the top surface 128 of the inner support wall.

The support walls of course are of highly porous nature to allow flow that has passed through the filtering element or bag to continue flowing. As shown in drawings, the support walls are shown formed from perforated sheet stock. For purposes of the drawings, the outer support wall is shown having holes or passages 123, the inner support wall 124 has holes or passages 125, the bottom surface 126 has holes or passages 127, and the top surface 128 has passages 129. The support walls could also be wire mesh and can be made in a wide variety of materials and shapes.

As shown in FIG. 8, the mounting flange 130 of the support element 120 rests on the internal shoulder 54 of the housing which is the transition between the wide portion 52 and the narrow portion 56 of the filter housing. The fabric 82 of the filtering element bag 80 will be urged against the inner surface of the outer support wall and the circular top 84 will be urged against the top of mounting flange 130 by the pressure of the filter being filtered. Additionally, the circular top 84 coacts with the wide portion of the filter housing to provide a seal to prevent bypass of liquid from the dirty side to the clean side of the filter element. Similarly, the fluid pressure will urge the fabric of the bag forming the inner filtering surface against the inner support wall.

Referring to FIGS. 1 and 8, note, that there is a radial space between the outer surface of the outer support wall 122 and the inner surface of the smaller portion of the filter housing. This allows for the passage of liquid through the filtering fabric 82 and then through the numerous passages or holes in the outer support wall and then on a pathway for the filtering liquid down to the outlet of the housing.

FIG. 9 shows another embodiment of the support element. In this embodiment, the support element generally indicated at 150 is composed of two backets, an outer basket 152 and an inner basket generally indicated at 162. The outer basket has a side wall 154 and a bottom surface 156. A mounting flange 158 extends from the top of the wall 154 of outer basket 152.

The inner support wall of this embodiment is provided by a second and smaller inner basket generally indicated at 162 having a side wall 164 and a closing surface 166 for supporting the closed end of the filter bag. The open end of the inner basket has a positioning and spacing flange 168 which is adapted to fit against the bottom or closing surface 156 of the outer basket. When the inner basket 162 is positioned within the outer basket 152, they form a support element which performs the function of the support element 120 previously described. As with the previously described support element, all of the surfaces of the composite support element 150 consists of porous surfaces, for example, wire mesh or sheet stock with numerous holes drilled in them.

Having described the apparatus, the method of assembling the filter assembly will now be described.

METHOD OF ASSEMBLY

The method of assembly is started by manipulating the filtering element to arrange it into multiple filtering surfaces. This is accomplished by reversing the open end of the filter bag over the body of the bag and bringing the open end of the bag towards the closed bottom surface of the bag. This manipulation is easily accomplished using the stretching element 100, by placing the bottom of the bag through the open ring 104 and then reversing the shaped open circular top of the bag over the outside of the ring 104 of the stretching element, as shown in FIG. 4.

The reversed bag is now inverted and placed over the bottom surface 126 of the inner support wall 124 and is urged downward over the inner support wall until the metal ring 86 and the circular top 84 of the bag comes to rest on the top of the outer support wall 122, preferably resting on or radially outward from the mounting flange 130 on the top of the outer support wall and coacting with the inner wall of the wide portion of the filter housing to provide a seal therewith. At the same time, the urging of the bag 80 downward by pushing down on the stretching element 100 will also bring the bottom 88 of bag 80 into contact with the closing surface 128 of the inner support wall 124. The cover 140 is then fastened to the top of the filter housing 40 to seal the filter.

The filter is then ready for operation. The fluid to be filtered will enter through the inlet and the pressure of the fluid flow will force the surfaces of the filtering element against the inner and outer support walls. The space above and between the inner and outer support walls will be filled with the unfiltered material and the space below, between or inside of the inner support walls and outside of the outer support walls will contain the filtered fluid which will then exit through the outlet 44 at the bottom of the filter housing. The pressure of the liquid to be filtered will force the filtering surfaces against the support surfaces to provide an appropriate seal and will provide a downward force tending to seat the shaped open circular top of filter bag 80 against the top of the outer support wall 122 and agaist the housing inner wall to provide an appropriate seal.

The stretching element 100 when positioned between the inner and outer support walls 122 and 124 respectively, will assist in the seating of the filtering element in the filter housing, and thereby the sealing of the filter housing inlet from the filter housing outlet. It will also assist in the proper positioning and stretching of the filtering element bag. As seen from the drawings, closing of the cover will cause contact between the upper ring 102 of the stretching element and the underside of the cover 140. As the cover is closed down, the lower ring 104 of stretching element 100 will bear against the lowermost portion of the bag which should be the transition area 92 joining the wider upper or outer portion 88 of the bag with the narrower or inner portion 90.

As the stretching element descends down, it will exert a downward force on the ring on the circular ring 86 to seat the bag against the upper portion of the outer support wall 122 and against the inner wall of the housing and will also force the bottom surface 88 of bag 80 over the closing surface 128 of the inner support wall.

After an appropriate period of use, the filtering element can be easily removed and replaced. The cover is removed and the handles 94 of the filtering element bag 80 are lifted to raise the bag out of the housing and simultaneously trap filtered material in the bag. Note, that there is no opportunity for any spilling of the filtered contents into the clean area of the filter since the filtered material will tend to fall to the bottom of the area between the inner and outer support walls and will be at the lower portion of the filtering bag during the removal of the filtering element.

It should be noted that the construction of this filter allows for a relatively large filtering surface for the length and the diameter of the filter housing employed. Further, there is relatively little unfiltered or dirty side volume to clean side volume in the filter housing. Note also, that the construction of the apparatus provides for effective sealing between the inlet and the outlet of the filter housing with relatively little requirement for close or critical tolerances. Also, the pressure of the inlet liquid tends to properly seat and position the filter bag. Note also, that the bag is relatively easy to install and remove. Further, the stretching element properly positions and seats the filtering bag for a maximum filtering effect. Also, the stretching element has the beneficial effect of tending to properly position and seat the various components of the filter assembly.

Further, it should be noted that all of the more exacting manipulations or operations necessary to form the filtering bag in its proper configuration can be accomplished when the bag is outside of the filter housing where access is easy and there is greater freedom to work. Once the bag is properly formed it can then be easily inserted into the filter housing with its support structure in a single step. This, therefore, will minimize the down time of the filter and tend to reduce the problems of contaminating the clean side of the filter which often occurs during the installation or removal processes of the filtering element.

It will be understood that various changes in the details, materials, arrangements or parts and operating conditions which have been herein described and illustrated in order to explain the nature of the invention may be made by those skilled in the art within the principles and the scope of the invention as set forth in the appended claims.

What is claimed is:

1. A filter assembly comprising a housing having:
   a wall; an open end; a closed end; an inlet; an outlet; and mounting means in the housing extended into the housing between the inlet and the outlet;
   inner and outer concentrically disposed perforated support surfaces mounted in the housing;
   said outer surface mounted on said mounting means and said inner surface connected to said outer surface;
   the outer surface spaced from said wall;
   means connecting at least one of said support surfaces to the housing;
   a filter element having an open end and closed end reversed upon itself to form concentrically disposed inner and outer filtering surfaces mounted on and supported by the inner and outer support surfaces, respectively;
   means for sealing the filter element between the inlet and outlet of the housing to sealing interpose the filter element between the inlet and the outlet of the housing;
   a cover connected to close the open end of the housing;
   stretching means coacting with said filter element to position the filter element relative to the inner and outer support surfaces; and
   said filter element including:
   flexible filtering material forming a flexible thin-walled container;
   the thin-walled container having a closed end and an open end; and
   shaping means fastened to the open end of the thin-walled container to shape the opening of the flexible thin-walled container.

2. A filter assembly comprising:
   a filter housing having an inlet and an outlet;
   filter support means mounted within said housing between said inlet and said outlet including an inner filtering support surface and an outer filtering support surface;
   one-piece filter means having a surface covering said inner filtering support surface and having a surface mounted on said outer filtering support surface;
   means removably sealing said outer filtering surface of the filtering element between said housing and said outer filtering support surface to separate said housing inlet from said housing outlet and to prevent contact of filtered and unfiltered substances;
   means to removably support said support surfaces in the filter housing including a shoulder in said filter housing; a flange on said support surface for said outer filtering surface; said flange coacting with said shoulder to support said outer filter surface in said housing; stretching means disposed between said inner support surface and said support surface for the outer filtering surface; and said stretching means coacting with said filtering element to position said filtering element with relation to said inner and outer support surfaces.

3. The filter assembly of claim 2 wherein said support surfaces comprises two concentrically disposed porous cylindrical surfaces, the inner cylindrical surface forming said inner support surface and the outer cylindrical surface forming said outer support surface.

4. The filter assembly of claim 2 further comprising:
   cover means removably sealingly secured to the filter housing; and
   the cover means coacting with the stretching means to coact with the filtering element.

5. The filter assembly of claim 2 wherein said filter element includes an open end, shaping means fastened to said open end said shaping means coacting with said support surface of said outer filter surface to seal said outer filter surface to said support surface and said housing.

6. The filter assembly of claim 5 wherein the filtering element further comprises first and second elongated portions, said first portion and said second portion being in overlying position relative to the length of said filtering element thereby forming said inner and outer filtering surfaces.

7. The filter assembly of claim 6 wherein the filtering element further comprises:
   a wide upper portion;
   a narrow lower portion;
   a transition portion between the upper portion and the lower portion; and
   the wide upper portion adapted to be reversed around the narrow lower portion to form said outer and inner filtering surfaces.

8. A filter assembly comprising:

a filter housing having an inlet and an outlet;

filter support means mounted within said housing between said inlet and outlet including an inner filtering support surface and an outer filtering support surface;

filter means having a surface covering said inner filtering support surface and having a surface mounted on said outer filtering support surface;

means sealing one of said filtering surfaces of the filtering element to said housing to separate said housing inlet from said housing outlet and to prevent contact of filtered and unfiltered substances;

means coupled to said housing for mounting said filtering surfaces said mounting means including a support surface for mounting said outer filtering surface; and wherein said seal includes means sealing said outer filtering surface to said housing;

said outer surface sealing means being removably sealed to said outer filtering surface;

said means to removably support said support surface in the filter housing comprising:

a shoulder in said filter housing;

a flange on said support surface for said outer filtering surface;

said flange coacting with said shoulder to support said outer filtering surface in said housing;

an inner support surface for said inner filtering surface;

means connecting said inner support surface to said support surface for the outer filtering surface;

stretching means disposed between said inner support surface and said outer support surface; and said stretching means coacting with said filter means to position said filter means with relation to said inner and outer support surfaces.

* * * * *